United States Patent
Baumann et al.

(10) Patent No.: US 10,956,458 B2
(45) Date of Patent: Mar. 23, 2021

(54) CONSOLIDATING TEXT CONVERSATIONS FROM COLLABORATION CHANNELS

(71) Applicant: International Business Machines Corporation, Armonk, NY (US)

(72) Inventors: Slade Baumann, Olmsted, MN (US); Jacob Gregor, Olmsted, MN (US); Ryan Rossiter, Rochester, MN (US); James Carey, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 15/823,003

(22) Filed: Nov. 27, 2017

(65) Prior Publication Data
US 2019/0163760 A1 May 30, 2019

(51) Int. Cl.
*G06F 3/048* (2013.01)
*G06F 16/30* (2019.01)
(Continued)

(52) U.S. Cl.
CPC ............ *G06F 16/30* (2019.01); *G06F 3/0484* (2013.01); *G06F 40/10* (2020.01); *G06F 40/279* (2020.01);
(Continued)

(58) Field of Classification Search
CPC ......... G06F 3/0481–0489; G06F 16/30; G06F 40/10; G06F 40/30; G06F 40/279; G06F 3/0484; G06Q 50/01; G06Q 10/107; G06Q 10/101; H04L 51/04; H04L 51/046; H04L 65/403; H04L 12/1822; H04L 12/1813; H04L 51/16; H04L 51/36; H04L 51/10; H04L 51/18; H04L 65/4015; H04L 65/1093
See application file for complete search history.

(56) References Cited

U.S. PATENT DOCUMENTS

| 5,668,863 A | 9/1997 | Bieselin et al. |
| 5,740,355 A | 4/1998 | Watanabe et al. |

(Continued)

OTHER PUBLICATIONS

Spiro et al. "Rumoring during extreme events: A case study of Deepwater Horizon 2010." Proceedings of the 4th Annual ACM Web Science Conference. ACM, 2012., pp. 275-283.
(Continued)

*Primary Examiner* — Steven B Theriault
(74) *Attorney, Agent, or Firm* — Schmeiser, Olsen & Watts, LLP; Maeve Carpenter

(57) ABSTRACT

A method, a computer system, and a computer program product are disclosed for consolidating text conversations from text collaboration channels. An algorithm is executed to: identify a set of parameters from a first, a second, and a third set of textual data, associated with a first, a second, and a third collaboration channel, respectively; compare the parameters of the sets of data to identify a parameter that is a same parameter from the first set of textual data and the second set of textual data; and determine a frequency at which the first and second set of data comprise the identified parameter. In response to a determination that the frequency exceeds a threshold, the algorithm may further generate and display another set of data that includes the first and second set of data on a user interface.

19 Claims, 4 Drawing Sheets

US 10,956,458 B2
Page 2

(51) Int. Cl.
*G06F 3/0484* (2013.01)
*G06Q 10/10* (2012.01)
*G06F 40/10* (2020.01)
*G06F 40/30* (2020.01)
*G06F 40/279* (2020.01)
*G06Q 50/00* (2012.01)

(52) U.S. Cl.
CPC ......... *G06F 40/30* (2020.01); *G06Q 10/103* (2013.01); *G06Q 50/01* (2013.01)

(56) References Cited

U.S. PATENT DOCUMENTS

| | | | | |
|---|---|---|---|---|
| 6,064,420 | A | 5/2000 | Harrison et al. | |
| 6,212,548 | B1* | 4/2001 | DeSimone | H04L 12/1813 709/204 |
| 6,345,290 | B2* | 2/2002 | Okada | H04L 12/1813 709/203 |
| 7,039,677 | B2* | 5/2006 | Fitzpatrick | H04L 12/1827 709/204 |
| 7,111,044 | B2* | 9/2006 | Lee | H04L 12/1827 709/204 |
| 7,185,055 | B2* | 2/2007 | Matsumoto | H04L 12/1822 205/217 |
| 7,260,605 | B1* | 8/2007 | Okada | G06Q 10/10 709/206 |
| 7,426,540 | B1* | 9/2008 | Matsumoto | H04L 12/1822 709/203 |
| 7,769,809 | B2* | 8/2010 | Samdadiya | H04L 65/1069 370/352 |
| 7,856,469 | B2* | 12/2010 | Chen | H04L 51/04 709/203 |
| 8,006,191 | B1* | 8/2011 | Anderson | G06Q 10/107 715/751 |
| 8,135,115 | B1 | 3/2012 | Hogg, Jr. et al. | |
| 8,161,106 | B2* | 4/2012 | Quinn | G06Q 10/00 463/42 |
| 8,201,095 | B2* | 6/2012 | Dewar | G06F 16/334 715/759 |
| 8,296,152 | B2* | 10/2012 | Issa | G06Q 10/10 379/201.01 |
| 8,351,580 | B1 | 1/2013 | O'Connor | |
| 8,418,069 | B2* | 4/2013 | Wanderski | G06Q 10/00 715/758 |
| 8,667,403 | B2* | 3/2014 | Kwon | H04L 12/1822 379/88.17 |
| 8,683,375 | B2* | 3/2014 | Sano | G06F 3/0483 715/702 |
| 8,762,475 | B2* | 6/2014 | Cheung | H04L 51/04 709/207 |
| 8,782,133 | B2* | 7/2014 | Coutts | G06Q 10/107 709/204 |
| 8,819,536 | B1* | 8/2014 | Lucovsky | G06Q 10/10 715/205 |
| 8,848,027 | B2* | 9/2014 | DeLand | H04L 12/1813 348/14.08 |
| 8,903,922 | B2* | 12/2014 | Wyatt | G06Q 10/107 370/352 |
| 9,047,590 | B2* | 6/2015 | Patterson | G06Q 10/107 |
| 9,117,211 | B2* | 8/2015 | Bauchot | G06Q 20/40 |
| 9,130,893 | B2* | 9/2015 | Chang | H04L 51/04 |
| 9,135,593 | B2* | 9/2015 | Patterson | G06Q 10/06311 |
| 9,195,739 | B2* | 11/2015 | Imig | H04L 12/1818 |
| 9,262,053 | B2* | 2/2016 | Jegal | G06F 3/0482 |
| 9,281,952 | B2* | 3/2016 | Keohane | G06Q 10/107 |
| 9,330,378 | B2* | 5/2016 | Bastide | H04L 67/22 |
| 9,766,088 | B2* | 9/2017 | Nesladek | G01C 21/265 |
| 9,843,543 | B2* | 12/2017 | Ghafourifar | H04L 51/36 |
| 9,948,589 | B2* | 4/2018 | Gonnen | H04L 51/18 |
| 9,954,808 | B2* | 4/2018 | Lan | G06F 16/2282 |
| 9,967,215 | B2* | 5/2018 | Chhaochharia | G06Q 30/02 |
| 10,013,463 | B2* | 7/2018 | Wissner | G06F 16/972 |
| 10,021,059 | B1* | 7/2018 | Rao | H04L 51/10 |
| 10,104,020 | B2* | 10/2018 | Barak | G06Q 30/0609 |
| 10,110,523 | B2* | 10/2018 | Badge | H04L 51/046 |
| 10,116,599 | B2* | 10/2018 | Wu | H04L 51/046 |
| 10,135,764 | B2* | 11/2018 | Ghafourifar | H04L 51/066 |
| 10,140,740 | B2* | 11/2018 | Zhang | G06T 11/60 |
| 10,164,783 | B2* | 12/2018 | Alexander | H04L 12/1813 |
| 10,234,951 | B2* | 3/2019 | Park | H04L 51/22 |
| 10,268,340 | B2* | 4/2019 | Chen | H04L 51/16 |
| 10,297,255 | B2* | 5/2019 | Jacobson | G06F 3/167 |
| 10,331,292 | B2* | 6/2019 | Arisada | G06F 3/0481 |
| 10,374,985 | B2* | 8/2019 | Kim | H04L 51/04 |
| 2001/0051989 | A1* | 12/2001 | Moncreiff | G06Q 10/107 709/206 |
| 2003/0023684 | A1* | 1/2003 | Brown | H04L 12/1827 709/204 |
| 2003/0088623 | A1* | 5/2003 | Kusuda | H04L 12/66 709/204 |
| 2005/0120306 | A1* | 6/2005 | Klassen | G06F 3/04817 715/765 |
| 2005/0181878 | A1* | 8/2005 | Danieli | A63F 13/12 463/42 |
| 2005/0235034 | A1* | 10/2005 | Chen | H04L 12/1831 709/206 |
| 2005/0262199 | A1* | 11/2005 | Chen | G06Q 10/107 709/204 |
| 2006/0059235 | A1* | 3/2006 | Peterson | G06Q 10/00 709/206 |
| 2006/0161631 | A1* | 7/2006 | Lira | G06F 17/214 709/206 |
| 2006/0174207 | A1* | 8/2006 | Deshpande | G06Q 10/107 715/758 |
| 2007/0288560 | A1* | 12/2007 | Bou-Ghannam | G06Q 10/107 709/204 |
| 2008/0115068 | A1* | 5/2008 | Smith | H04L 12/1813 715/758 |
| 2008/0242324 | A1* | 10/2008 | Smuga | H04L 51/38 455/466 |
| 2009/0094329 | A1* | 4/2009 | Ambati | G06Q 10/10 709/204 |
| 2009/0177735 | A1* | 7/2009 | Algie | G06Q 30/0601 709/203 |
| 2009/0241031 | A1* | 9/2009 | Gamaley | G06F 3/0481 715/736 |
| 2010/0005268 | A1* | 1/2010 | Yang | H04L 12/1831 711/202 |
| 2010/0005402 | A1* | 1/2010 | George | H04L 51/04 715/758 |
| 2010/0205541 | A1* | 8/2010 | Rapaport | G06Q 10/10 715/753 |
| 2010/0223335 | A1* | 9/2010 | Fu | H04L 12/1818 709/205 |
| 2010/0306185 | A1* | 12/2010 | Smith | G06Q 10/107 707/709 |
| 2011/0010182 | A1* | 1/2011 | Turski | G06Q 10/107 705/1.1 |
| 2011/0150198 | A1* | 6/2011 | Walsh | H04M 3/56 379/202.01 |
| 2012/0023113 | A1* | 1/2012 | Ferren | G06F 16/9535 707/751 |
| 2012/0210253 | A1* | 8/2012 | Luna | G06Q 10/107 715/753 |
| 2012/0221656 | A1* | 8/2012 | Cai | H04L 51/16 709/206 |
| 2012/0236103 | A1* | 9/2012 | Cahill | G06Q 10/101 348/14.01 |
| 2012/0240062 | A1* | 9/2012 | Passmore | H04L 51/32 715/758 |
| 2013/0014035 | A1* | 1/2013 | Won | H04M 1/72552 715/758 |
| 2013/0091443 | A1* | 4/2013 | Park | G06F 3/0485 715/758 |
| 2013/0318589 | A1* | 11/2013 | Ford | H04L 63/08 726/7 |
| 2014/0025757 | A1* | 1/2014 | Haugen | H04L 51/10 709/206 |

(56) References Cited

U.S. PATENT DOCUMENTS

| | | | | |
|---|---|---|---|---|
| 2014/0173430 A1* | 6/2014 | Clavel | H04L 12/1822 | 715/716 |
| 2014/0222429 A1* | 8/2014 | DeLand | H04L 12/1813 | 704/251 |
| 2014/0270131 A1* | 9/2014 | Hand | H04M 3/42 | 379/208.01 |
| 2014/0330912 A1* | 11/2014 | Mizuki | H04L 51/32 | 709/206 |
| 2015/0172227 A1* | 6/2015 | Grove, II | H04L 51/32 | 709/206 |
| 2015/0186455 A1* | 7/2015 | Horling | G06Q 10/107 | 707/722 |
| 2015/0193457 A1* | 7/2015 | Radhakrishnan | G06F 16/285 | 707/812 |
| 2015/0242391 A1* | 8/2015 | Goel | G06F 17/2785 | 704/9 |
| 2015/0319203 A1* | 11/2015 | Jeremias | H04L 51/20 | 715/753 |
| 2016/0050157 A1* | 2/2016 | Abbott | H04L 47/624 | 709/223 |
| 2016/0065519 A1* | 3/2016 | Waltermann | H04L 51/16 | 709/206 |
| 2016/0241494 A1* | 8/2016 | Badge | H04L 51/046 | |
| 2016/0255024 A1* | 9/2016 | Tichauer | H04L 51/24 | 709/206 |
| 2016/0301771 A1* | 10/2016 | Choudhari | H04L 67/327 | |
| 2017/0019474 A1* | 1/2017 | Tevosyan | G06Q 50/01 | |
| 2017/0032021 A1 | 2/2017 | Watanachote | | |
| 2017/0180284 A1* | 6/2017 | Smullen | H04L 67/322 | |
| 2018/0196796 A1* | 7/2018 | Wu | G06F 17/279 | |
| 2018/0337796 A1* | 11/2018 | Pavlin | G06Q 50/01 | |
| 2019/0075141 A1* | 3/2019 | Albouyeh | H04L 65/403 | |

OTHER PUBLICATIONS

Wang et al. "Recovering Implicit Thread Structure in Newsgroup Style Conversations." Association for the Advancement of Artificial Intelligence (www.aaai.org). (2008)., 9 pages.

Schull et al., "Multichat: Persistent, Text-As-You-Type Messaging in a Web Browser for Fluid Multi-Person Interaction and Collaboration." System Sciences, 2006. HICSS'06. Proceedings of the 39th Annual Hawaii Internationa Conference on. vol. 3. IEEE, 2006., pp. 1-9.

* cited by examiner

CONSOLIDATING TEXT CONVERSATIONS FROM COLLABORATION CHANNELS

TECHNICAL FIELD

The present invention relates to consolidating text conversations from text collaboration channels.

BACKGROUND

Text-based collaboration channels allow users to share ideas, work on projects, and engage in conversations in a continuous textual stream. This continuous stream results in intermixed conversations. For example, a first message drafted by a first user on a first text-based collaboration channel may be split up into two messages by a second message drafted by a second user. The intermixing of the conversations results in a high degree of "noise" with respect to a single conversation. Further, this noise may make it difficult for users who may want to join and follow a specified conversation after the conversation has been underway for a period of time.

Also, the conversation may move from a first text-based collaboration channel to a second text-based collaboration channel or from a first text-based service to a second text-based service. If the user isn't monitoring one of the text-based collaboration channels or one of the text-based services, the user may find it extremely difficult to determine the originating text-based collaboration channel or the originating text-based service.

SUMMARY

In one embodiment, the present invention provides a method and associated computer program product and computer system to consolidate text conversations from collaboration channels. The method may include: detecting, by one or more processors of a computer system, a first set of textual data on a first text collaboration channel, a second set of textual data on a second text collaboration channel, and a third set of textual data on a third text collaboration channel; identifying, by said one or more processors, a first set of parameters from said first set of textual data, a second set of parameters from said second set of textual data, and a third set of parameters from said third set of textual data; and comparing, by said one or more processors, said first set of parameters, said second set of parameters, and said third set of parameters. In response to said comparing, the method may further include: identifying, by said one or more processors, a parameter that is a same parameter from said first set of parameters and from said second set of parameters; and determining, by said one or more processors, a frequency at which said first set of textual data and said second set of textual data comprise said identified parameter. In response to a determination that said frequency of said identified parameter exceeds a threshold, the method may further include: grouping, by said one or more processors, said first set of textual data and said second set of textual data together; generating, by said one or more processors, a fourth set of textual data, wherein said fourth set of textual data includes said first set of textual data and said second set of textual data; sorting, by said one or more processors, said fourth set of textual data, based on said identified parameter, in an order; and displaying, on a user interface by said one or more processors, said fourth set of textual data.

DETAILED DESCRIPTION

Consumers face numerous problems while engaging in conversations in text-based collaboration channels or text-based services. As these channels and services allow for the continuous stream of conversations, a specified conversation the user is following may get lost within the other intermixed conversations or "noise." The continuous stream of conversations may be between multiple people, multiple topics, and in multiple time zones. Additionally, the specified conversation may move from one text-based collaboration channel or text-based service to another, making it very difficult for the user to follow. To improve the ability of the user to follow the specified conversation, embodiments of the present invention provide solutions to intelligently identify and consolidate text of the specified conversation based on one or more identified parameter (e.g., a name of the sender, a topic of the conversation, a tone of the conversation, etc.), which is a significant improvement over traditional text collaborative systems that fail to provide enhanced user interactivity with these text collaborative systems.

Figure 1:
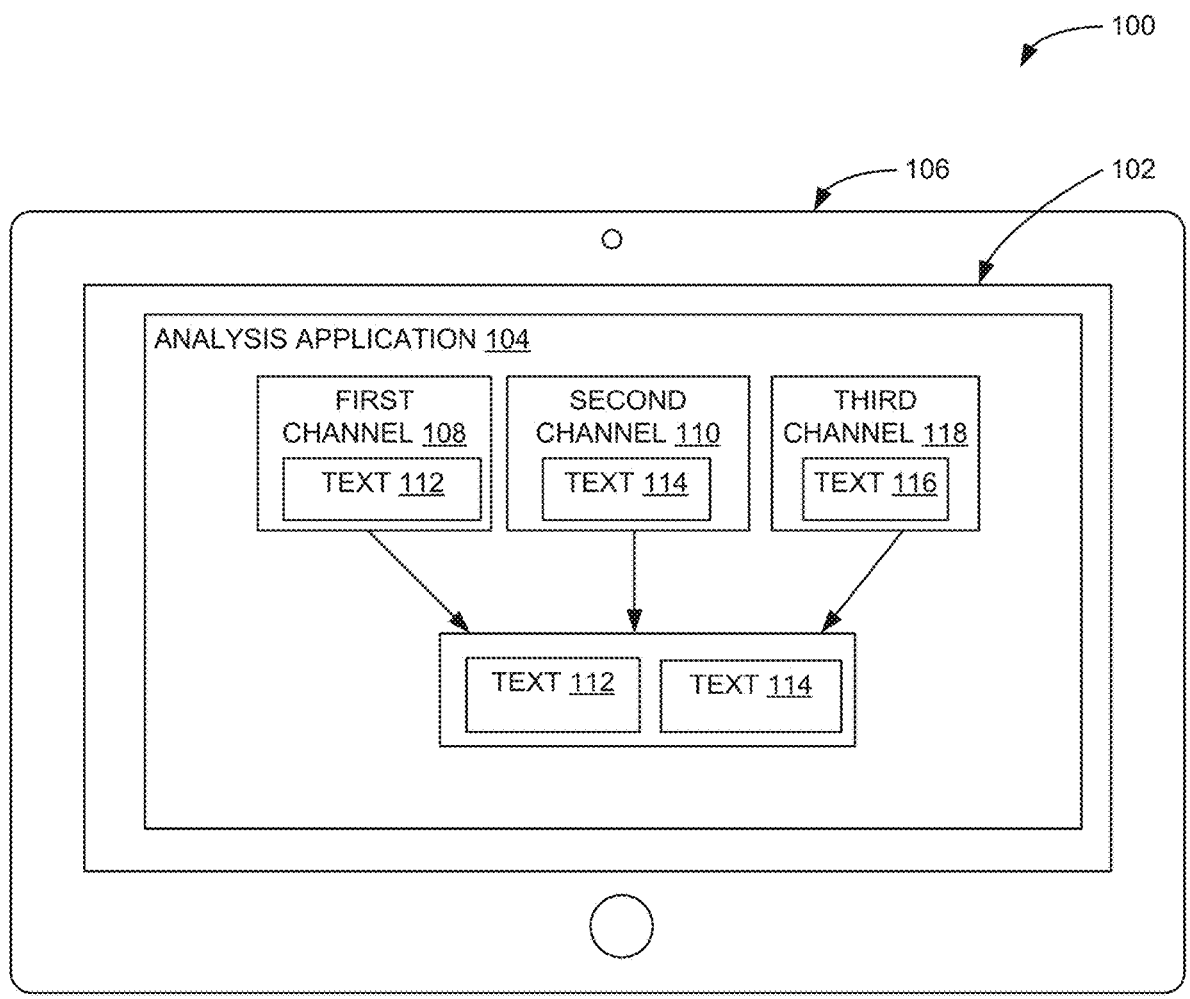
FIG. 1 is a block diagram of a system configured to consolidate text conversations from collaboration channels, in accordance with embodiments of the present invention.

FIG. 1 is a block diagram of a system configured to consolidate text conversations from collaboration channels, in accordance with embodiments of the present invention.

The FIG. 1 displays a system 100 configured to consolidate text conversations (e.g., a first set of textual data 112 from a first conversation, a second set of textual data 114 from a second conversation, and/or a third set of textual data 116 from a third conversation) from text collaboration channels (a first text collaboration channel 108, a second text collaboration channel 110, and/or a third text collaboration channel 118). The first set of textual data 112 from the first conversation may be associated with the first text collaboration channel 108, the second set of textual data 114 from the second conversation may be associated with the second text collaboration channel 110, and the third set of textual data 116 from the third conversation may be associated with the third text collaboration channel 118, respectively.

Furthermore, the first set of textual data 112, the second set of textual data 114, and/or the third set of textual data 116 may additionally be associated with audio content and/or graphical content. In additional examples, the first conversation, the second conversation, and/or the third conversation may span multiple text collaboration channels or text-based collaboration services. In further examples, the first conversation, the second conversation, and/or the third conversation may span multiple time zones.

In an example, the text collaboration channels (the first text collaboration channel 108, the second text collaboration channel 110, and/or the third text collaboration channel 118) may include text-based social media channels. In an example, the first text collaboration channel 108, the second text collaboration channel 110, and/or the third text collaboration channel 118 may be identical text-based social media channels. In another example, the first text collaboration channel 108, the second text collaboration channel 110, and/or the third text collaboration channel 118 may be differing text-based social media channels. In further examples, the first text collaboration channel 108, the second text collaboration channel 110, and/or the third text collaboration channel 118 may be used as text-based productive channels for teams, groups, or organizations. These productive channels may allow users to collaborate on assignments, projects, tasks, and/or work, among other examples.

In an illustrative example, the system may include, among other components, a computing device 106. The computing device 106 may include a user interface 102. An analysis application 104 may be executed on the user interface 102 of the computing device 106. In other examples, the analysis application 104 may be an analysis engine or an analysis service, among other examples.

In a merely illustrative example, the analysis application 104 may detect, during a first time period, the first set of textual data 112 from the first conversation on the first text collaboration channel 108, the second set of textual data 114 from the second conversation on the second text collaboration channel 110, and the third set of textual data 116 from the third conversation on the third text collaboration channel 118. In some examples, the analysis application 104 may detect and gather the first set of textual data 112, the second set of textual data 114, and the third set of textual data 116 from the first text collaboration channel 108, the second text collaboration channel 110, and the third text collaboration channel 118, respectively, through use of a first application programming interface (API) provided by the first text collaboration channel 108, the second text collaboration channel 110, and the third text collaboration channel 118. The first API or a second API may be applied to the retrieved first set of textual data 112, the second set of textual data 114, and the third set of textual data 116. In further examples, the second API may be a natural language processing API. In some examples, the natural language processing API may be used to determine one or more topics within the first set of textual data 112, the second set of textual data 114, and/or the third set of textual data 116. In some examples, the first API and the second API are identical. In other examples, the first API and the second API are differing API's.

Then, the analysis application 104 may execute an algorithm during the first time period. In response to the execution of the algorithm, the analysis application 104 may identify and compare a first set of parameters from the first set of textual data 112, a second set of parameters from the second set of textual data 114, and a third set of parameters from the third set of textual data 116. A non-exhaustive list of the first set of parameters from the first set of textual data 112, the second set of parameters from the second set of textual data 114, and the third set of parameters from the third set of textual data 116 may include: a name of a sender, a name of a recipient, an entity associated with the textual data, a tone of the textual data, a timestamp associated with the textual data, and/or username associated with the textual data. In other examples, the first set of parameters from the first set of textual data 112, the second set of parameters from the second set of textual data 114, and/or the third set of parameters may evolve between the first time period and a second time period.

In further examples, the algorithm may be a topic segmentation algorithm utilized to identify a topic of the first set of textual data 112, the second set of textual data 114, and/or the third set of textual data 116. Further, the topic segmentation algorithm may identify parameters of the first set of parameters, the second set of parameters, and/or the third set of parameters as including: a topic of the textual data, a phrase within the textual data, and/or keywords associated with the topic of the textual data.

Next, in response to the comparison step, the analysis application 104 may identify a parameter (e.g., the username associated with the textual data) that is a same parameter in the first set of parameters and the second set of parameters. Also, in response to the comparison step, the analysis application 104 may further determine a frequency at which the first set of textual data 112 and the second set of textual data 114 comprise the identified parameter. The frequency at which the first set of textual data 112 and the second set of textual data 114 comprise the identified parameter. The frequency may be measured in: a numerical frequency (e.g., five matches of the identified parameter, the username associated with the textual data, between the first set of textual data 112 and the second set of textual data 114 during the first time period) or a percentage frequency (e.g., a 10% match of the identified parameter, the username associated with the textual data, between the first set of textual data 112 and the second set of textual data 114 during the first time period), among other examples.

Then, the analysis application 104 may determine the frequency of the identified parameter as exceeding a threshold. The threshold may be a predetermined threshold or a user-defined threshold. Further, the threshold may include a numerical threshold and/or a time frame threshold, among other examples. As an illustrative example, the analysis application 104 may determine that the frequency of the identified parameter (e.g., five matches of the identified parameter, the username associated with the textual data, between the first set of textual data 112 and the second set of textual data 114 during the first time period) exceeds the numerical threshold (e.g., two matches of the identified parameter, the username associated with the textual data, between the first set of textual data 112 and the second set of textual data 114 during the first time period).

In response to the determination that the frequency of the identified parameter exceeds the threshold, the analysis application 104 may group the first set of textual data 112 and the second set of textual data 114 together. Then, the analysis application 104 may generate a fourth set of textual data, which includes the first set of textual data 112 and the second set of textual data 114.

In further examples, the analysis application 104 may then sort the fourth set of textual data (e.g., the combination of the first set of textual data 112 and the second set of textual data 114) based on the identified parameter (e.g., the username associated with the textual data) in an order. The order may include a chronological order based on a timestamp associated with the first set of textual data 112 and the second set of textual data 114, a reverse chronological order based on the timestamp, an alphabetical ascending order associated with the username of the textual data, and an alphabetical descending order associated with the username of the textual data, or combinations thereof. Additionally, the analysis application 104 may then display the ordered fourth set of textual data on the user interface 102 of the computing device 106. The fourth set of textual data may be displayed on a pane or a pop-up window on the user interface 102, among other examples.

In a further example, a user may utilize a device to interact with the user interface 102 of the computing device 106. The device may include: a stylus pen, a mouse, or a finger of the user, among other examples. In some examples, the user may utilize the device to interact with the user interface 102 to: add, modify, or delete content (e.g., textual content, audio content, and/or graphical content) from one or more of: the first set of textual data 112, the second set of textual data 114, the third set of textual data 116, and/or a fourth set of textual data. In other examples, the user may utilize the device to interact with the user interface 102 to modify: the threshold, the sorting method to order the fourth set of textual data, and/or the ordered fourth set of textual data.

In additional examples, the analysis application 104, the analysis engine, or the analysis service, may act as a cognitive agent to consume user-defined preferences. For example, the user may utilize the device to interact with the user interface 102 to modify the following user-defined preferences: a time frame associated with the sent timestamp associated with the textual content (e.g., the timestamp associated with when a first user sent the first set of textual data 112 to a second user) and/or a time frame associated with the receipt timestamp of the textual content (e.g., the timestamp associated with when the second user received the first set of textual data 112 from the first user). For example, the user may specify a time range associated with the sent timestamp of the first set of textual data 112. The time range may be between hours (e.g., between 10:00 AM EST and 5:00 PM EST on Oct. 2, 2017), days (e.g., between Oct. 2, 2017 and Oct. 4, 2017), weeks (e.g., the two weeks between Oct. 2, 2017 and Oct. 16, 2017), or months (e.g., between August of 2017 and September of 2017), among other examples. As such, the analysis application 104 may only display the first set of textual data on the user interface 102 that meets the user-defined time range parameter.

As another example, the user may utilize the device to interact with the user interface 102 to modify the user-defined preferences associated with a name of a sender, a username associated with a sender, a group associated with the sender, and/or an entity associated with the sender, as the user may only wish to view the textual content associated with a specific sender, group, or entity. In another illustrative example, the user may utilize the device to interact with the user interface 102 to modify the user-defined preferences associated with a tone of the textual data, as the user may only wish to view the textual content containing a specific tone. In a further illustrative example, the user may utilize the device to interact with the user interface 102 to modify the user-defined preferences associated with a topic of the textual data, a phrase within the textual data, and/or keywords associated with the topic of the textual data, as the user may only wish to view the textual content containing a specific topic, phrase, and/or keywords. In response to one or more of these modifications, the analysis application 104 may only display the textual data that meets the user-defined preferences on the user interface 102.

In further examples, the analysis application 104, the analysis engine, or the analysis service, may act as a cognitive agent to consume the user-defined preferences during a first time period. The analysis application 104 may utilize the user-defined preferences to update parameters associated with the analysis application 104, modify thresholds associated with the analysis application 104, and/or train the analysis application 104. Then, during a second time period, the analysis application 104 may utilize the user-defined preferences to ensure the user needs are met.

In another example, the user may utilize the device to interact with the user interface 102 to select a message within the first set of textual data 112 and mark the message as irrelevant or not belonging within the fourth set of textual data. In response, the analysis application 104 may remove the selected message from the fourth set of textual data and remove display of the selected message on the user interface 102. In a further example, the user may utilize the device to interact with the user interface 102 to select a message within the third set of textual data 116 and mark the message as relevant to or belonging within the fourth set of textual data. In response, the analysis application 104 may add the selected message from the third set of textual data 116 into the fourth set of textual data and may display the selected message within the fourth set of textual data on the user interface 102.

Figure 2:
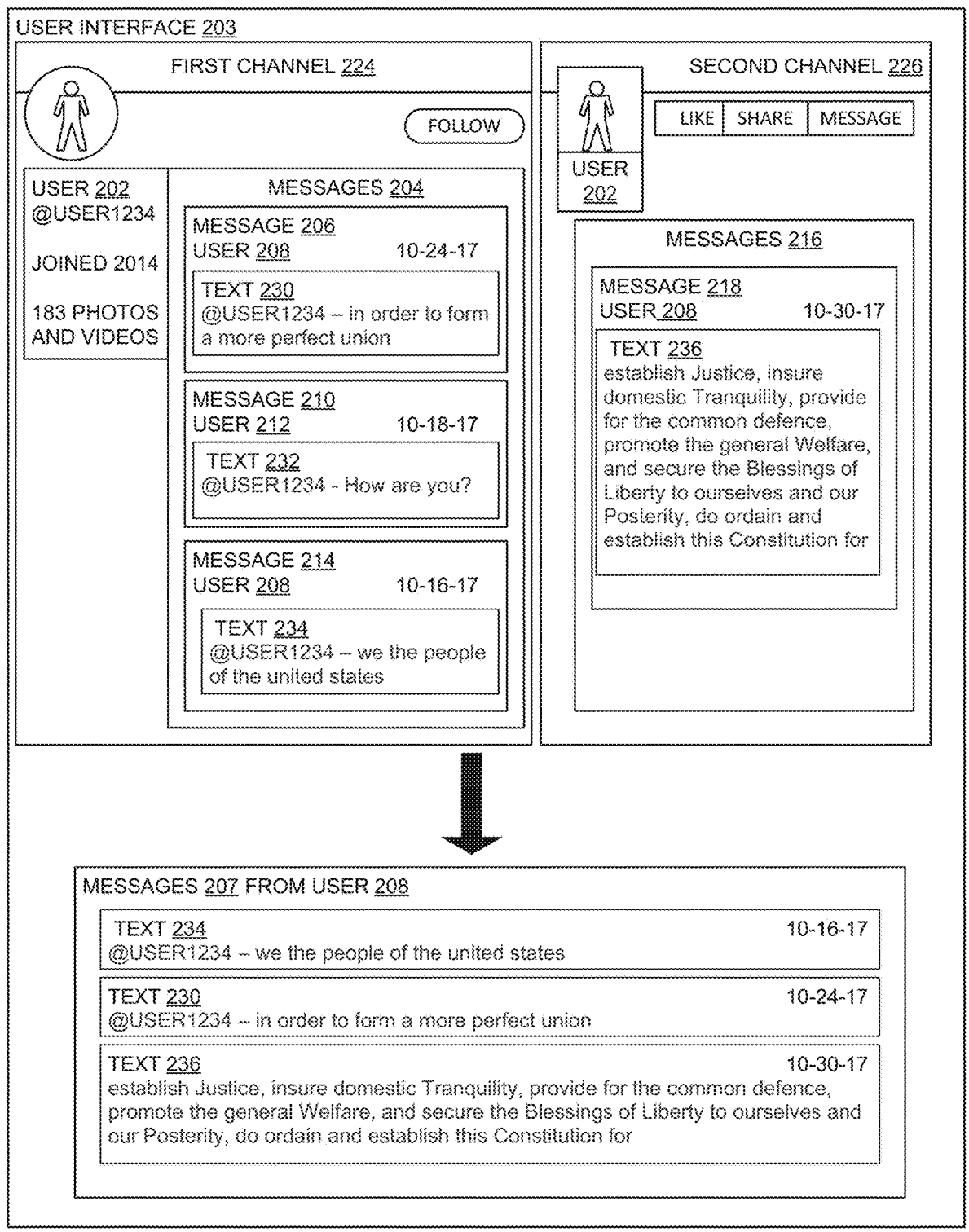
FIG. 2 illustrates a schematic diagram configured to consolidate text conversations from collaboration channels, in accordance with embodiments of the present invention.
Figure 3:
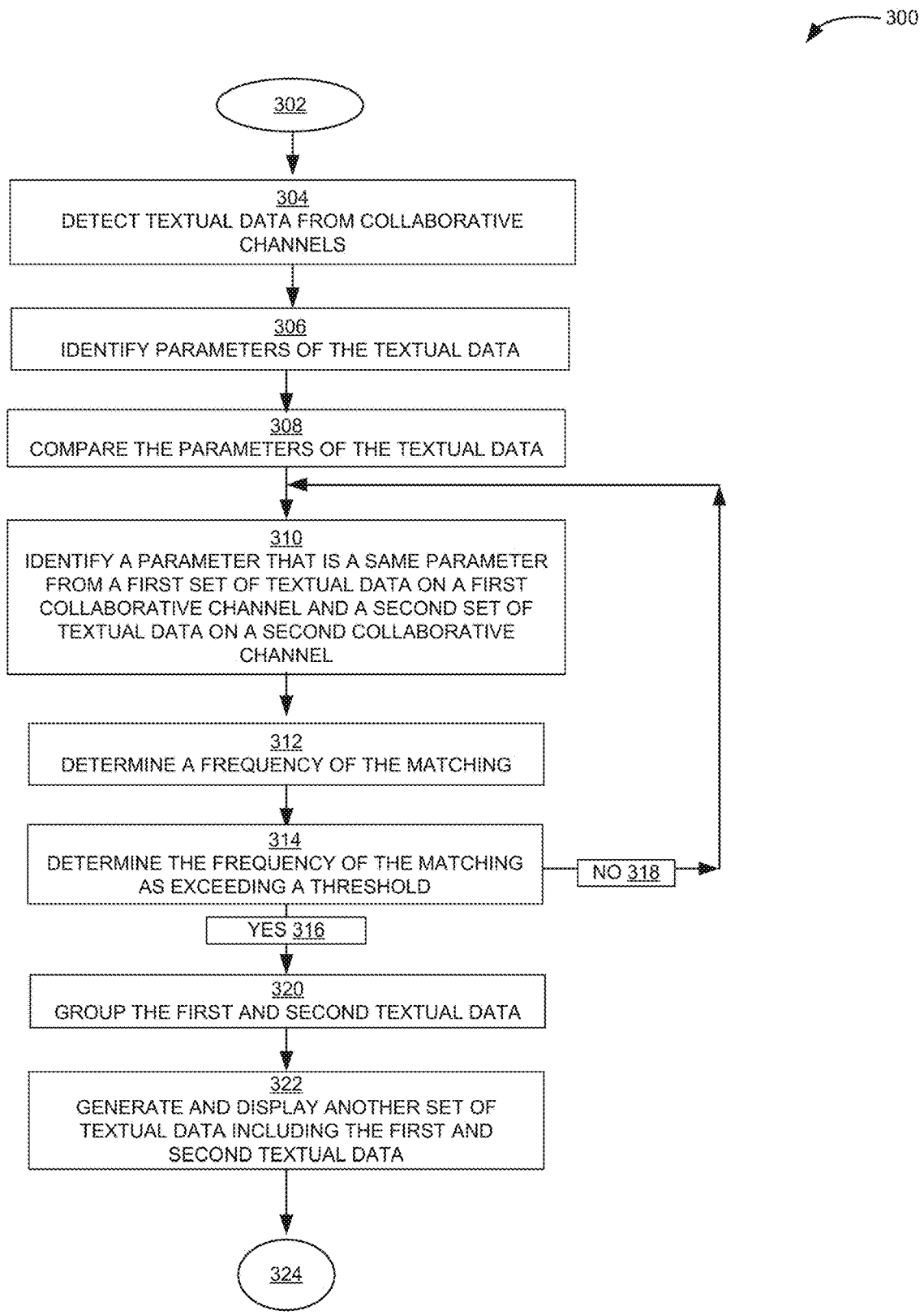
FIG. 3 is a flowchart of a process executed by an analysis application on a computing device to consolidate text conversations from collaboration channels, in accordance with embodiments of the present invention.
Figure 4:
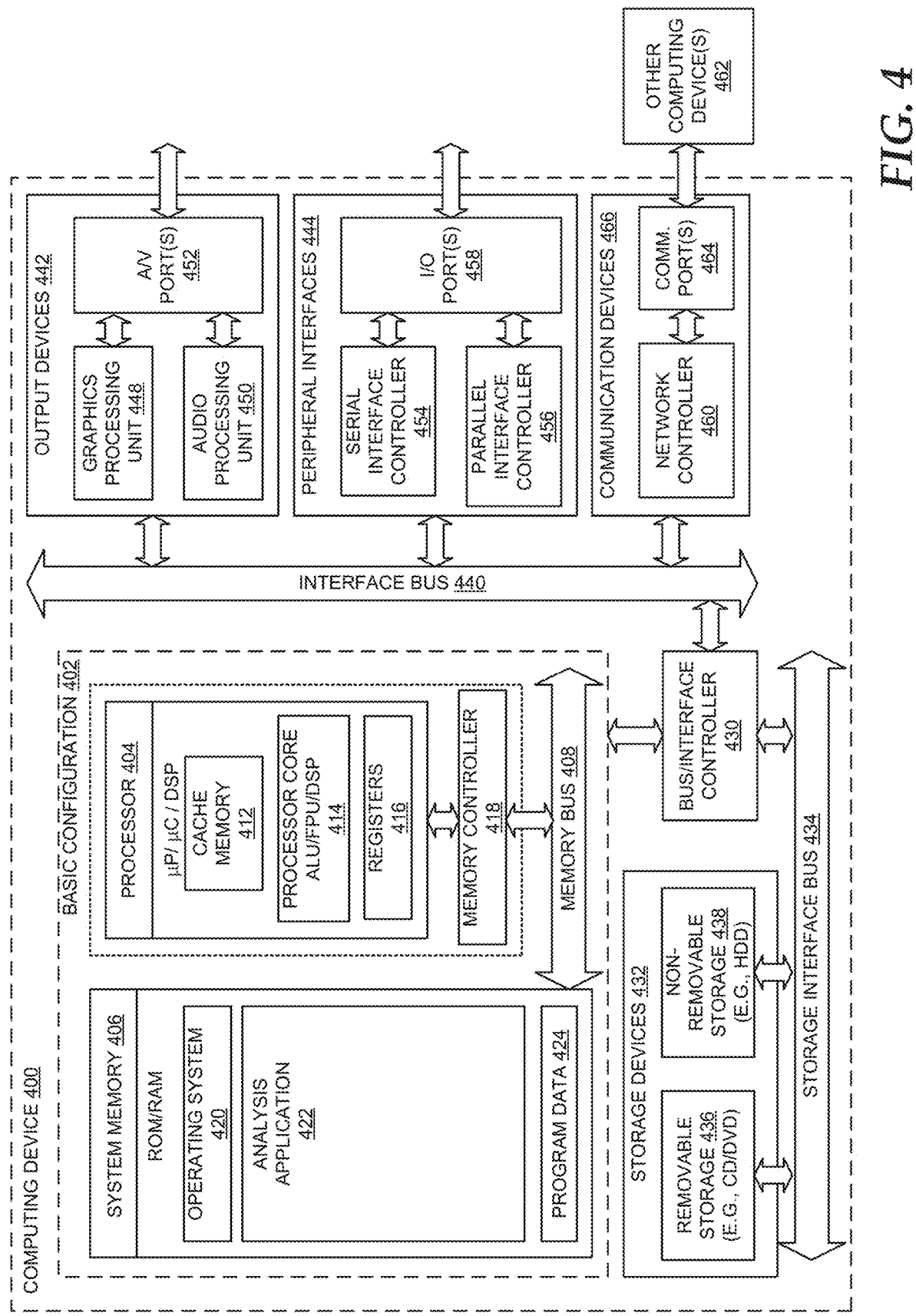
FIG. 4 is a block diagram of a computing device included within the system of FIG. 1 and that implements the processes of FIG. 3, in accordance with embodiments of the present invention.

The functionality of the components shown in FIG. 1 is described in more detail in the discussion of FIG. 2, FIG. 3, and FIG. 4 presented below.

FIG. 2 illustrates a schematic diagram configured to consolidate text conversations from collaboration channels, in accordance with embodiments of the present invention.

A system 200 is illustrated in FIG. 2. As described supra in reference to FIG. 1, the system 200 may include a computing device (e.g., the computing device 106 of FIG. 1). The computing device may include a user interface 203. An analysis application (e.g., the analysis application 104 of FIG. 1) may be executed on the user interface 203 of the computing device (e.g., the computing device 106 of FIG. 1). In other examples, the analysis application (e.g., the analysis application 104 of FIG. 1) may be an analysis engine or an analysis service, among other examples.

As a merely illustrative example, the analysis application (e.g., the analysis application 104 of FIG. 1) may detect a first set of textual data (messages 204) on a first text collaboration channel 224 and may detect a second set of textual data (messages 216) on a second text collaboration channel 226. The first text collaboration channel 224 and the second text collaboration channel 226 may be a text-based social media channel or may be a text-based productivity channel. In one example, the first text collaboration channel 224 and the second text collaboration channel 226 may be identical text-based social media channels or identical text-based productivity channels. In another example, the first text collaboration channel 224 and the second text collaboration channel 226 may be differing text-based social media channels or text-based productivity channels. In some examples, the first set of textual data (e.g., the messages 204) and/or the second set of textual data (e.g., the messages 216) may additional include audio content and/or graphical content.

The first text collaboration channel 224 and the second text collaboration channel 226 may be associated with a user 202. In an example, the user 202 may set up a user profile on the first text collaboration channel 224 and on the second text collaboration channel 226. In some examples, the text collaboration channels may be designed such that each of the messages may be capped at a specific number of characters. In this instance, a conversation by one user may get split up and intermixed with conversations of other users on the text collaboration channel.

The first set of textual data (the messages 204) may include: a first message 214 from a user 208 on a first date (e.g., Oct. 16, 2017), a second message 210 from a user 212 on a second date (e.g., Oct. 18, 2017), and a third message

206 from the user 208 on a third date (e.g., Oct. 24, 2017). The first message 214 may include text 234 (e.g., "@USER1234—we the people of the united states"). The second message 210 may include text 232 (e.g., "@USER1234—How are you?"). The third message 206 may include text 230 (e.g., "@USER1234—in order to form a more perfect union").

The second set of textual data (the messages 216) may include: a fourth message 218 from the user 208 on a fourth date (e.g., Oct. 30, 2017). The fourth message 218 may include text 236 (e.g., "establish Justice, insure domestic Tranquility, provide for the common defence, promote the general Welfare, and secure the Blessings of Liberty to ourselves and our Posterity, do ordain and establish this Constitution for").

Once the analysis application (e.g., the analysis application 104 of FIG. 1) detects the first set of textual data (the messages 204) on the first text collaboration channel 224 and the second set of textual data (the messages 216) on the second text collaboration channel 226, the analysis application (e.g., the analysis application 104 of FIG. 1) may execute an algorithm during a first time period. In other examples, the algorithm may learn via the user input and/or trace the user activity between the first text collaboration channel 224 and the second text collaboration channel 226. In further examples, the algorithm may be a linguistic processing algorithm, among other types of algorithms. In further embodiments, algorithms available via an application programming interface (API) may additionally be applied. In other examples, the API may be a sentiment analyzer. In further examples, the algorithm may discover patterns during the first time period and may apply these patterns during a second time period.

In some examples, the linguistic processing algorithm may analyze the first set of textual data (the messages 204) and the second set of textual data (the messages 216) at a paragraph level of the textual data or a sentence level of the textual data, among other examples. Based on the analysis of the first set of textual data (the messages 204) and the second set of textual data (the messages 216), the linguistic processing algorithm may determine an intent and/or a tone of the textual data. The intent may include a positive intent or a negative intent. The tone of the textual data may include a positive sentiment or a negative sentiment. In additional examples, a tone analyzer service, such as the IBM Watson™ Tone Analyzer service, may utilize linguistic analysis to detect the tone within the textual data.

Upon execution by the analysis application (e.g., the analysis application 104 of FIG. 1), the algorithm may identify a first set of parameters from the first set of textual data (the messages 204) and a second set of parameters from the second set of textual data (the messages 216). The analysis application (e.g., the analysis application 104 of FIG. 1) may then compare the first and second sets set of parameters from the first set of textual data (the messages 204) and the second set of parameters from the second set of textual data (the messages 216), respectively. The first set of parameters from the first set of textual data (the messages 204) and the second set of parameters from the second set of textual data (the messages 216) may include: a name of a sender, a name of a recipient, an entity associated with the textual data, a tone of the textual data, an intent associated with said textual data, a topic of the textual data, a phrase within the textual data, keywords associated with the topic of the textual data, a timestamp associated with the textual data, and/or username associated with the textual data.

In an illustrative example, the set of parameters of the first message 214 may include: the name of the sender (e.g., the user 208), the name of the recipient (e.g., the user 202), the tone of the textual data (e.g., a neutral sentiment as the text 234 is reciting the preamble to the United States Constitution), the topic of the textual data (e.g., the preamble to the United States Constitution), the phrase within the textual data (e.g., "we the people"), the keywords associated with the topic (e.g., the preamble to the United States Constitution) of the textual data (e.g., "the people," and "united states"), the timestamp associated with the textual data (e.g., Oct. 16, 2017), and the username associated with the textual data (e.g., "@USER1234").

In another illustrative example, the set of parameters of the second message 210 may include: the name of the sender (e.g., the user 212), the name of the recipient (e.g., the user 202), the tone of the textual data (e.g., a positive sentiment as the text 232 is asking a friendly question of how the other user is), the timestamp associated with the textual data (e.g., Oct. 18, 2017), and the username associated with the textual data (e.g., "@USER1234").

In a further illustrative example, the set of parameters of the third message 206 may include: the name of the sender (e.g., the user 208), the name of the recipient (e.g., the user 202), the tone of the textual data (e.g., a neutral sentiment as the text 230 is reciting part of the preamble to the United States Constitution), the topic of the textual data (e.g., the preamble to the United States Constitution), the phrase within the textual data (e.g., "in order to form a more perfect"), the timestamp associated with the textual data (e.g., Oct. 24, 2017), and the username associated with the textual data (e.g., "@USER1234").

In another illustrative example, the set of parameters of the fourth message 218 may include: the name of the sender (e.g., the user 208), the name of the recipient (e.g., the user 202), the tone of the textual data (e.g., a neutral sentiment as the text 236 is reciting part of the preamble to the United States Constitution), the topic of the textual data (e.g., the preamble to the United States Constitution), the phrase within the textual data (e.g., "establish Justice," "insure domestic Tranquility," "common defence," "general Welfare," "Blessings of Liberty," "our Posterity," "ordain and establish," etc.), the timestamp associated with the textual data (e.g., Oct. 30, 2017), and the username associated with the textual data (e.g., "@USER1234").

Then, in response to the comparison step, the analysis application (e.g., the analysis application 104 of FIG. 1) may then identify a parameter that is a same parameter in the first set of parameters from the first set of textual data (the messages 204) and the second set of parameters from the second set of textual data (the messages 216). For example, the analysis application (e.g., the analysis application 104 of FIG. 1) may then identify one or more identified parameters from the first set of parameters and the second set of parameters: the name of the sender (e.g., the user 208), the name of the recipient (e.g., the user 202), the tone of the textual data (e.g., a neutral sentiment), and/or the topic of the textual data (e.g., the preamble to the United States Constitution), among others.

Then, the analysis application (e.g., the analysis application 104 of FIG. 1) may determine a frequency at which the first set of textual data (the messages 204) and the second set of textual data (the messages 216) comprise the identified parameter. The frequency may be measured as a numerical frequency or a percentage frequency, among other examples. For example, the analysis application (e.g., the analysis application 104 of FIG. 1) may determine a 100% frequency match between the following parameters of the first message 214, the third message 206, and the fourth message 218: the name of the sender (e.g., the user 208), the name of the recipient (e.g., the user 202), the tone of the textual data (e.g., a neutral sentiment), the username associated with the textual data (e.g., "@USER1234"), and/or the topic of the textual data (e.g., the preamble to the United States Constitution), among others.

In other examples, the analysis application (e.g., the analysis application 104 of FIG. 1) may determine a high percentage frequency match between the phrases within the textual data of the text 234 of the first message 214 (e.g., "we the people"), the text 230 of the third message 206 (e.g., "in order to form a more perfect"), and the text 236 of the fourth message 218 (e.g., "establish Justice," "insure domestic Tranquility," "common defence," "general Welfare," "Blessings of Liberty," "our Posterity," "ordain and establish," etc.), as the phrases within the textual data are not identical between the messages, but are closely related as referring to the preamble of the United States Constitution. In other examples, the analysis application (e.g., the analysis application 104 of FIG. 1) may determine a high percentage frequency match between the timestamp associated with the text 234 of the first message 214 (e.g., Oct. 16, 2017), the text 230 of the third message 206 (e.g., Oct. 24, 2017), and the text 236 of the fourth message 218 (e.g., Oct. 30, 2017).

Next, the analysis application (e.g., the analysis application 104 of FIG. 1) may determine the frequency of the identified parameter or identified parameters as exceeding a threshold. The threshold may be a predetermined threshold or may be a user-defined threshold. In an example, the threshold may be a numerical threshold. For example, the analysis application (e.g., the analysis application 104 of FIG. 1) may determine that the frequency of the parameter (e.g., the name of the sender) for the text 234 of the first message 214, the text 230 of the third message 206, and the text 236 of the fourth message 218 exceeds the numerical threshold (e.g., two matches of the identified parameter during the first time period). In response, the analysis application (e.g., the analysis application 104 of FIG. 1) may group the text 234 of the first message 214, the text 230 of the third message 206, and the text 236 of the fourth message 218 together. The analysis application (e.g., the analysis application 104 of FIG. 1) may then generate a third set of textual data (e.g., messages 207 from the user 208). The third set of textual data (e.g., the messages 207 from the user 208) may include the text 234 of the first message 214, the text 230 of the third message 206, and the text 236 of the fourth message 218.

As described in FIG. 2, the gathered third set of textual data may result in a data structure, such as:

```
gathered_conversation = {'messages': [
                {"tool": "slack",
                 "channel": "channel1",
                 "uuid": "ABC1234",
                 "user": "user208",
                 "timestamp": "2017-10-16 16:10:06.872 2230",
                 "references": ["@user1234", "wethepeople"]
                },
                {"tool": "slack",
                 "channel": "channel1",
                 "uuid": "ABC1235",
                 "user": "user208",
                 "timestamp": "2017-10-24 16:10:06.872 2230",
                 "references": ["@user1234", "moreperfectunion"]
                },
```

-continued

```
                {"tool": "irc",
                 "channel": "channel2",
                 "uuid": "ABC1238",
                 "user": "user208",
                 "timestamp": "2017-10-30 16:10:06.872 2230",
                 "references": ["@user1234", "establishjustice"]
                },
                ...
                ],
       "metadata": {"Tone": "neutral","Experts": ["user208"]}
}
```

Then, the analysis application (e.g., the analysis application 104 of FIG. 1) may sort the third set of textual data (e.g., the messages 207 from the user 208) based on the identified parameter. The third set of textual data (e.g., the messages 207 from the user 208) may be sorted based on: a chronological order, a reverse chronological order, an alphabetical ascending order, and an alphabetical descending order, or combinations thereof. Next, the analysis application (e.g., the analysis application 104 of FIG. 1) may display the third set of textual data (e.g., the messages 207 from the user 208) on the user interface 203 of the computing device (e.g., the computing device 106 of FIG. 1). In additional examples, the third set of textual data (e.g., the messages 207 from the user 208) may be displayed on the user interface 203 with additional parameters, such as a source identifier (e.g., an identification of the text collaboration channel from which the text came from).

In some examples, the analysis application (e.g., the analysis application 104 of FIG. 1) may receive, from the user, a modification to the order of the third set of textual data (e.g., the messages 207 from the user 208). In an example, the modification may include: replacing the chronological ordering with the reverse chronological ordering, replacing the reverse chronological ordering with the chronological ordering, replacing the alphabetical ascending ordering with the alphabetical descending ordering, or replacing the alphabetical descending ordering with the alphabetical ascending ordering, among other examples. Then, the analysis application (e.g., the analysis application 104 of FIG. 1) may execute this modification to the order of the third set of textual data (e.g., the messages 207 from the user 208) and display the modified order of the third set of textual data (e.g., the messages 204 from the user 208) on the user interface 203.

In additional examples, if another user selects the text 236 in the second text collaboration channel 226, for example, the analysis application (e.g., the analysis application 104 of FIG. 1) may then display the entire ordered conversation containing the text 236 during the first time period. In other examples, if the other user selects the text 236 in the second text collaboration channel 226, the analysis application (e.g., the analysis application 104 of FIG. 1) may display a pop-up or a message including the entire ordered conversation containing the text 236 during the first time period.

In another illustrative embodiment, the analysis application (e.g., the analysis application 104 of FIG. 1) may retrieve messages (e.g., the messages 204 and the messages 216) from API's provided by the text collaboration channels (e.g., the first text collaboration channel 224 and the second text collaboration channel 226). Next, the analysis application (e.g., the analysis application 104 of FIG. 1) may perform a Latent Dirichlet Allocation (LDA) process on the retrieved messages (e.g., the messages 204 and the messages 216). Then, the analysis application (e.g., the analysis application 104 of FIG. 1) may execute an algorithm on the text (e.g., the text 230, the text 232, the text 234, and the text 236) of the retrieved messages (e.g., the messages 204 and the messages 216).

In some examples, the algorithm may analyze a tone of the text (e.g., the text 230 associated with the third message 206). In some examples, the algorithm may be a tone analyzer algorithm. In other examples, a tone analyzer service, such as the IBM Watson™ Tone Analyzer service, may utilize linguistic analysis to detect the tone of the text (e.g., the text 230 associated with the third message 206). Based on an identified neutral sentiment or positive sentiment of the text 230, the analysis application (e.g., the analysis application 104 of FIG. 1) may determine the topic A of the text 230 as resolved by user A during the first time period and may conclude the process. The analysis application (e.g., the analysis application 104 of FIG. 1) may save the association of the user A resolving the topic A during the first time period in a repository.

The repository may include associations of users who have solved or contributed to resolution of various topics during the first time period (e.g., the user A associated with the resolution of the topic A, a user B associated with the resolution of the topic B, etc.). The repository may additionally include a level of contribution to the resolution of a specific topic. For example, if the user B added insight to the topic A, but the user A resolved the majority of the topic, this contribution may be defined within the repository as a percentage contribution or a numerical contribution value. The user who contributed the majority to a specific topic may be identified as an "expert" of that topic. If, during a second time period, the topic A is unresolved in additional text (e.g., the text 234), the analysis application (e.g., the analysis application 104 of FIG. 1) may notify and may prompt the user A (e.g., the "expert") to resolve the topic A. In some examples, if the user A is unable to fully resolve the topic A during the second time period, the analysis application (e.g., the analysis application 104 of FIG. 1) may notify the user B to contribute to the resolution of the topic A.

In other examples, the algorithm may analyze a tone of the text (e.g., the text 230) during a second time period and may identify the tone of the text 230 as having a negative sentiment. Based on this identification, the analysis application (e.g., the analysis application 104 of FIG. 1) may determine a topic C of the text 230 as unresolved. The analysis application (e.g., the analysis application 104 of FIG. 1) may then consult the repository to determine which user may be best suited to resolve the topic C. If the analysis application (e.g., the analysis application 104 of FIG. 1) determines the user F as having the largest level of contribution to the topic C during the first time period, the analysis application (e.g., the analysis application 104 of FIG. 1) may notify and prompt the user F to resolve the topic C of the text 230 during the second time period.

In a further illustrative embodiment, the user may select the first message 214 that contains the text 234. The analysis application (e.g., the analysis application 104 of FIG. 1) may then retrieve the conversation (e.g., the messages 207 from the user 208), which includes the text 234 from the first message 214, the text 230 from the third message 206, and the text 236 from the fourth message 218. Then, the analysis application (e.g., the analysis application 104 of FIG. 1) may utilize the LDA process to determine if any additional outward references exist to other text collaboration channels.

In a further illustrative example, the process described in relation to FIG. 2 may occur in real-time, and as such, the third set of textual data (e.g., the messages 207 from the user 208) may be dynamically updated in real-time. If another user joins the conversation late or during a second time period, this dynamic updating of the third set of textual data (e.g., the messages 207 from the user 208) ensures the other user does not miss any messages from the conversation and may instantly participate in the conversation.

Further, the analysis application (e.g., the analysis application 104 of FIG. 1) may receive a user action to select a parameter (e.g., the username associated with the textual data). In response to receiving the user action, the analysis application (e.g., the analysis application 104 of FIG. 1) may gather and display the text of each message associated with the selected parameter (e.g., the username associated with the textual data). For example, in response to receiving the user action selecting the username associated with the textual data (e.g., "@USER1234") at a first location on the user interface 203, the analysis application (e.g., the analysis application 104 of FIG. 1) may gather and display, on the user interface 203, the text of each message (e.g., the text 234 of the first message 214, the text 232 of the second message 210, and the text 230 of the third message 206), which includes this username.

The examples described in relation to FIG. 2 are merely illustrative and do not include an exhaustive list of all possible embodiments.

FIG. 3 is a flowchart of a process executed by an analysis application on a computing device to consolidate text conversations from collaboration channels, in accordance with embodiments of the present invention.

The process 300 of FIG. 3 may be implemented by an analysis service, an analysis application executed on a computing device, or an analysis application executed on a computer system.

The process of FIG. 3 begins at a step 302. The step 302 is followed by a step 304, where the analysis application on the computing device may detect textual data from text collaboration channels. The textual data may include a first set of textual data from a first conversation, a second set of textual data from a second conversation, and/or a third set of textual data from a third conversation. The first set of textual data may be located on a first text collaboration channel during a first time period. The second set of textual data may be located on a second text collaboration channel during the first time period. The third set of textual data may be located on a third text collaboration channel during the first time period.

In some examples, the first set of textual data, the second set of textual data, and/or the third set of textual data may include audio content and/or graphical content. In additional examples, the first text collaboration channel, the second text collaboration channel, and the third text collaboration channel may be identical text-based social media channels or identical text-based productivity channels. In other examples, the first text collaboration channel, the second text collaboration channel, and the third text collaboration channel may be differing text-based social media channels or differing text-based productivity channels.

The step 304 may be followed by a step 306, where the analysis application may be configured to execute an algorithm on the textual data (e.g., the first set of textual data, the second set of textual data, and/or the third set of textual data) during the first time period. The algorithm may be a linguistic processing algorithm, among others. In some examples, the linguistic processing algorithm may be executed at a paragraph level of the textual data or a sentence level of the textual data. In additional examples, the algorithm may be implemented with an application programming interface (API). In further examples, the API may be a natural language processing API. The execution of the algorithm during the step 306 may include performance of several steps, such as: a step 308, a step 310, a step 312, a step 314, a step 316, a step 318 or a step 320, a step 322, and a step 324.

Further, during the step 306, the analysis application may identify parameters of the first set of textual data, the second set of textual data, and/or the third set of textual data. A first set of parameters from the first set of textual data, a second set of parameters from the second set of textual data, and/or a third set of parameters from the third set of textual data may include, among others: a name of a sender, a name of a recipient, an entity associated with the textual data, a tone of the textual data, an intent associated with the textual data, a topic of the textual data, a phrase within the textual data, keywords associated with the topic of the textual data, a timestamp associated with the textual data, and/or username associated with the textual data. The intent may include a positive intent or a negative intent. The tone of the textual data may include a positive sentiment, a neutral sentiment, or a negative sentiment.

Responsive to the step 306, the analysis application may execute the step 308 to compare the parameters of the textual data. Responsive to the step 308, the analysis application may execute the step 310 to identify a parameter that is a same parameter from the first set of parameters of the first set of textual data (associated with the first text collaboration channel) and the second set of parameters from the second set of textual data (associated with the second text collaboration channel).

Responsive to the step 310, the analysis application may execute the step 312 to determine a frequency at which the first set of textual data and the second set of textual data comprise the identified parameter. Responsive to the step 312, the analysis application may execute the step 314 to determine if the match frequency exceeds a threshold. The threshold may include a predetermined threshold or a user-defined threshold.

Responsive to the step 314, if the match frequency exceeds the threshold (e.g., a result of "yes" for the step 316), the process will proceed to execute the step 320, the step 322, and the step 324. Responsive to the step 314, if the match frequency does not exceed the threshold (e.g., a result of "no" for the step 318), the analysis application will re-execute the step 310, the step 312, and the step 314.

The step 316 may be followed by the step 320, where the analysis application may group the first set of textual data and the second set of textual data together. Then, the step 320 may be followed by the step 322, where the analysis application may generate another set of textual data, which may include the first set of textual data and the second set of textual data. In some embodiments, the analysis application may also sort the other set of textual data based on the identified parameter into an order. The order may include: a chronological order, a reverse chronological order, an alphabetical ascending order, and an alphabetical descending order, or combinations thereof.

Then, in further embodiments, the analysis application may display, on a user interface of the computing device, the other set of textual data. In some examples, the analysis application may additionally display a source identifier with the other set of textual data on the user interface. The source identifier may reference the text collaboration channel from which the text originated (e.g., the first text collaboration channel or the second text collaboration channel).

In some examples, the analysis application may receive, from a user, a modification to the order of the other set of textual data. In response, the analysis application may execute the modification on the order of the other set of textual data to generate a modified order. Then, the analysis application may display the modified order of the other set of textual data on the user interface of the computing device.

The step 322 is followed by a step 324, which concludes the process.

As a merely illustrative example engaging the process steps of FIG. 3, a user A may join a group dedicated to automobile repair and maintenance (e.g., a General Auto Repair group) on a text collaboration channel (e.g., a channel A). The user A may enter text A on the channel A during a first time period. The text A may include an automobile repair inquiry regarding a problem the user A is having with an automobile. Also during the first time period, other users (e.g., a user B and a user C), who are members of the General Auto Repair group on the channel A, may be engaging in various conversations.

During the first time period, the user B may additionally offer suggestions (e.g., text B) in response to the text A the user A enters on the channel A. The text B may suggest that the user A move the automobile repair inquiry of the text A from the channel A to a channel B, as the channel B include a more specialized automobile repair and maintenance group (e.g., a Drill Auto Repair group). Multiple users exist as members of the Drill Auto Repair group on the channel B, including a user D and a user E. The user D and the user E are engaging in multiple conversations on the channel B during the first time period.

The user A may move the automobile repair inquiry of the text A to the Drill Auto Repair group on the channel B during the first time period, resulting in text C on the channel B. As such, during the first time period, the user A engages in multiple conversations on multiple text channels (e.g., the text A on the channel A and the text C on the channel B). However, the user B and the user C are engaging in various conversations on the channel A during the first time period. Also, the user D and the user E are engaging in multiple conversations on the channel B during the first time period. These conversations may make it difficult for a user to pinpoint and follow the automobile repair inquiry from the user A.

As such, an analysis application may be executed on the computing device to perform the process steps of the FIG. 3. First, the analysis application may execute the step 304 to detect the textual data from the text collaborative channels. At this step, the analysis application may detect the text A and the text B on the channel A. The analysis application may also detect the text C on the channel B. Next, the analysis application may proceed to execute the step 306. At the step 306, the analysis application may execute an algorithm on the text A, the text B, and the text C. In response to execution of the algorithm, the analysis application may then identify parameters of the text A, the text B, and the text C. In this example, the parameters may include: a name of the sender associated with the text and a topic of conversation associated with the text. For example, the name of the sender associated with the text A is the user A. The topic of the text A is the automobile repair inquiry. The name of the sender associated with the text B is the user B. The topic of the text B is a suggestion regarding the automobile repair inquiry. The name of the sender associated with the text C is the user A. The topic of the text C is the automobile repair inquiry.

Next, the step 306 may be followed by the step 308, where the analysis application may compare the parameters of the text A, the text B, and the text C. At the step 310 (which follows the step 308), the analysis application may identify a parameter between the channel A and the channel B as matching. Here, the analysis application may identify the name of the user (e.g., the user A) and the topic of the conversation associated with the textual data (e.g., the automobile repair inquiry) as matching between the text A on the channel A and the text C on the channel B.

In response to the step 310, the analysis application may execute the step 312 to determine a frequency of the matching. For example, the frequency may include a numerical frequency (e.g., one match of the identified parameter during the first time period). Next, the analysis application may execute the step 314 subsequent the step 312 to determine if the match frequency exceeds a threshold. For example, the threshold maybe a time limit threshold (e.g., during the first time period). Since the analysis application identified one match of the name of the user between the text A of the channel A and the name of the user of the text C of the channel B during the first time period, this match frequency for the parameter of the name of the user would exceed the time limit threshold. Further, since the analysis application identified one match of the topic of the conversation of the textual data between the text A and the text C during the first time period, the match frequency for the parameter of the topic of the textual data would exceed the time limit threshold. As such, the process proceeds pass the step 316 to the step 320.

At the step 320, the analysis application may group the text A and the text C together based on the identified parameters (e.g., the name of the sender and the topic of the conversation associated with the text) exceeding the timing threshold. Then, the step 320 is followed by the step 322, where the analysis application may generate another set of textual data, which includes the text A and the text C. In some examples, the analysis application may display the other set of textual data on the user interface of the computing device. In some examples, the other set of textual data may be displayed as a single column on the user interface. In further examples, if the text A and the text C of the other set of textual data overlap, the other set of textual data may be displayed as parallel columns (to avoid any overlap). The execution of these process steps allows a user F to easily view the textual conversation of the user A and assist the user A in the automobile repair inquiry.

FIG. 4 is a block diagram of a computing device included within the system of FIG. 1 and that implements the processes of FIG. 3, in accordance with embodiments of the present invention.

In some embodiments, the present invention may be a method, a computer system, and/or a computer program product configured to implement a method to consolidate text conversations from text collaboration channels. The process steps of the method may be executed by an analysis application (e.g., the analysis application 104 of FIG. 1), which may be executed on a computing device (e.g., the computing device 106 of FIG. 1 or the computing device 400 of FIG. 4). In other examples, the process steps of the method may be executed by an analysis service or an analysis engine.

In an example, basic configuration 402, the computing device 400 includes one or more processors 404 and a system memory 406. A memory bus 408 is used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (μP), a microcontroller (μC), a digital signal processor (DSP), or any combination thereof. The processor 404 may include one more levels of caching, such as a level cache memory 412, an example processor core 414, and registers 416, among other examples. The example processor core 414 may include an arithmetic logic unit (ALU), a floating point unit (FPU), a digital signal processing core (DSP Core), or any combination thereof. An example memory controller 418 is used with the processor 404, or in some implementations the example memory controller 418 is an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 includes an operating system 420, one or more engines, such as an analysis application 422, and program data 424, among other engines/modules. In some embodiments, the analysis application 422 may be an analysis engine or an analysis service.

In some examples, the analysis application 422 may be executed on the computing device. The analysis application 422 may detect a first set of textual data (e.g., the first set of textual data 112 of FIG. 1) on a first text collaboration channel (e.g., the first text collaboration channel 108 of FIG. 1), a second set of textual data (e.g., the second set of textual data 114 of FIG. 1) on a second text collaboration channel (e.g., the second text collaboration channel 110 of FIG. 1), and a third set of textual data (e.g., the third set of textual data 116 of FIG. 1) on a third text collaboration channel (e.g., the third text collaboration channel 118 of FIG. 1) during a first time period.

Then, the analysis application 422 may execute an algorithm during the first time period. In response to the execution of the algorithm during the first time period, the analysis application 422 may: identify a first set of parameters associated with the first set of textual data, a second set of parameters associated with the second set of textual data, and a third set of parameters associated with the third set of textual data. Also, the analysis application 422 may compare the first set of parameters associated with the first set of textual data, the second set of parameters associated with the second set of textual data, and the third set of parameters associated with the third set of textual data.

In response to the comparison, the analysis application 422 may then identify a parameter that is a same parameter from the first set of parameters associated with the first set of textual data and the second set of parameters associated with the second set of textual data as matching. The analysis application 422 may determine a frequency at which the first set of textual data and the second set of textual data comprise the identified parameter. In response to a determination that the frequency of the identified parameter exceeds a threshold, the analysis application 422 may group the first set of textual data and the second set of textual data together. The analysis application 422 may further generate another set of textual data, which includes the first set of textual data and the second set of textual data.

Further, the analysis application 422 may sort the other set of textual data, based on the identified parameter, in an order. The analysis application 422 may also display, on a user interface of the computing device, the other set of textual data.

The computing device 400 may have additional features or functionality, and additional interfaces to facilitate communications between the basic configuration 402 and any desired devices and interfaces. For example, a bus/interface controller 430 is used to facilitate communications between the basic configuration 402 and data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives, among others. Example computer storage media includes volatile and non-volatile, removable and non-removable media implemented in any method or technology for storage of information, such as computer-readable instructions, data structures, program modules, or other data.

In some embodiments, an interface bus 440 facilitates communication from various interface devices (e.g., one or more output devices 442, one or more peripheral interfaces 444, and one or more communication devices 466) to the basic configuration 402 via the bus/interface controller 430. Some of the one or more output devices 442 include a graphics processing unit 448 and an audio processing unit 450, which is configured to communicate to various external devices such as a display or speakers via one or more A/V ports 452. The one or more peripheral interfaces 444 include a serial interface controller 454 or a parallel interface controller 456, which are configured to communicate with external devices, such as input devices (e.g., keyboard, mouse, pen, voice input device, touch input device, etc.) or other peripheral devices (e.g., printer, scanner, etc.) via one or more I/O ports 458. An example of the one or more communication devices 466 include a network controller 460, which are arranged to facilitate communications with one or more other computing devices 462 over a network communication link via one or more communication ports 464. The one or more other computing devices 462 include servers, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media include wired media, such as a wired network or direct-wired connection, and wireless media, such as acoustic, radio frequency (RF), microwave, infrared (IR), and other wireless media. The term "computer-readable media," as used herein, includes both storage media and communication media.

The system memory 406, the removable storage devices 436, and the non-removable storage devices 438 are examples of the computer-readable storage media. The computer-readable storage media is a tangible device that can retain and store instructions (e.g., program code) for use by an instruction execution device (e.g., the computing device 400). Any such, computer storage media is part of the computing device 400.

Aspects of the present invention are described herein regarding schematic diagrams (e.g., FIG. 2), flowchart illustrations (e.g., FIG. 3) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by the computer-readable instructions (e.g., the program code).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computing device 400 may be implemented as a part of a general purpose or specialized server, mainframe, or similar computer that includes any of the above functions. The computing device 400 may also be implemented as a personal computer including both laptop computer and non-laptop computer configurations.

Another embodiment of the invention provides a method that performs the process steps on a subscription, advertising and/or fee basis. That is, a service provider, such as a Solution Integrator, can offer to create, maintain, and/or support, etc. a process of consolidating text conversations from text collaboration channels. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to consolidate text conversations from collaboration channels, said method comprising:

detecting, by one or more processors of a computer system, a first set of textual data on a first text collaboration channel, a second set of textual data on a second text collaboration channel, and a third set of textual data on a third text collaboration channel;

identifying, by said one or more processors, a first set of parameters from said first set of textual data, a second set of parameters from said second set of textual data, and a third set of parameters from said third set of textual data, wherein said set of parameters of said first set of textual data, said second set of textual data, and said third set of textual data are selected from the group consisting of: a name of a sender, a name of a recipient, an entity associated with said textual data, a tone of said textual data, an intent associated with said textual data, a topic of said textual data, a phrase within said textual data, keywords associated with said topic of said textual data, a timestamp associated with said textual data, a username associated with said textual data, and combinations thereof; and comparing, by said one or more processors, said first set of parameters, said second set of parameters, and said third set of parameters;

in response to said comparing, identifying, by said one or more processors, a parameter that is a same parameter from said first set of parameters and from said second set of parameters;

determining, by said one or more processors, a frequency at which said first set of textual data and said second set of textual data comprise said identified parameter, said frequency being a sum of a total number of occurrences of said identified parameter in said first set of textual data and a total number of occurrences of said identified parameter in said second set of textual data; and determining, by said one or more processors, that said frequency of said identified parameter exceeds a specified threshold; and in response to said determining that said frequency of said identified parameter exceeds said specified threshold,
grouping, by said one or more processors, said first set of textual data and said second set of textual data together;
generating, by said one or more processors, a fourth set of textual data, wherein said fourth set of textual data includes said first set of textual data and said second set of textual data;
sorting, by said one or more processors, said fourth set of textual data, based on said identified parameter, in an order; and
displaying, on a user interface by said one or more processors, said fourth set of textual data.

2. The method of claim 1, said method further comprising:
detecting, by said one or more processors, an action by a user to select a portion of said second set of textual data on said second text collaboration channel; and
displaying, by said one or more processors, said ordered fourth set of textual data on said user interface.

3. The method of claim 1, said method further comprising:
performing, during a first time period by said one or more processors, linguistic processing on said first set of textual data;
identifying, during said first time period by said one or more processors, a tone of said first set of textual data based on said linguistic processing, wherein said tone of said first set of textual data is selected from the group consisting of: a positive sentiment and a neutral sentiment;
in response to said identifying said tone of said first set of textual data, determining, during said first time period by said one or more processors, a resolution of a topic of said textual data by a user; and
creating, by said one or more processors, an association in a repository based on said resolution of said topic, wherein said association includes an identity of said user and said topic of said first set of textual data.

4. The method of claim 3, said method further comprising:
determining, by said one or more processors, a level of contribution associated with said resolution by said user of said topic during said first time period, wherein said level of contribution is measured as a percentage contribution or a numerical contribution; and
in response to a determination that the level of contribution exceeds a first threshold, identifying, by said one or more processors, said user as an expert user on said topic.

5. The method of claim 3, said method further comprising:
performing, during a second time period by said one or more processors, linguistic processing on said second set of textual data;
identifying, during said second time period by said one or more processors, a tone of said second set of textual data based on said linguistic processing, wherein said tone of said second set of textual data is a negative sentiment; and
in response to said identifying said tone of said second set of textual data, determining, during said second time period by said one or more processors, a topic of said second set of textual data as unresolved.

6. The method of claim 5, said method further comprising:
accessing, by said one or more processors, a repository to identify a user who has resolved said topic during said first time period;
in response to an identification of said user resulting from said accessing, notifying, by said one or more processors, said user of said unresolved topic; and
prompting, by said one or more processors, said user to resolve said topic during said second time period.

7. The method of claim 1, further comprising:
receiving, by said one or more processors from a user, a modification to said order of said sorted fourth set of textual data;
executing, by said one or more processors, said modification on said order of said sorted fourth set of textual data to generate a modified order; and
displaying, by said one or more processors, said modified order of said fourth set of textual data on said user interface.

8. The method of claim 1, wherein said order of said sorted fourth set of textual data is selected from the group consisting of: a chronological order, a reverse chronological order, an alphabetical ascending order, and an alphabetical descending order, or combinations thereof.

9. A computer system, comprising one or more processors, one or more memories, and one or more computer-readable hardware storage devices, said one or more computer-readable hardware storage devices containing program code executable by said one or more processors via said one or more memories to implement a method to consolidate text conversations from text collaboration channels, said method comprising:
detecting, by said one or more processors, a first set of textual data on a first text collaboration channel, a second set of textual data on a second text collaboration channel, and a third set of textual data on a third text collaboration channel;
identifying, by said one or more processors, a first set of parameters from said first set of textual data, a second set of parameters from said second set of textual data, and a third set of parameters from said third set of textual data, wherein said set of parameters of said first set of textual data, said second set of textual data, and said third set of textual data are selected from the group consisting of: a name of a sender, a name of a recipient, an entity associated with said textual data, a tone of said textual data, an intent associated with said textual data, a topic of said textual data, a phrase within said textual data, keywords associated with said topic of said textual data, a timestamp associated with said textual data, a username associated with said textual data, and combinations thereof; and
comparing, by said one or more processors, said first set of parameters, said second set of parameters, and said third set of parameters;
in response to said comparing,
identifying, by said one or more processors, a parameter that is a same parameter from said first set of parameters and from said second set of parameters;
determining, by said one or more processors, a frequency at which said first set of textual data and said second set of textual data comprise said identified parameter, said frequency being a sum of a total number of occurrences of said identified parameter in said first set of textual data and a total number of occurrences of said identified parameter in said second set of textual data; and
determining, by said one or more processors, that said frequency of said identified parameter exceeds a specified threshold; and in response to said determining that said frequency of said identified parameter exceeds said specified threshold,
grouping, by said one or more processors, said first set of textual data and said second set of textual data together;
generating, by said one or more processors, a fourth set of textual data, wherein said fourth set of textual data includes said first set of textual data and said second set of textual data;
sorting, by said one or more processors, said fourth set of textual data, based on said identified parameter, in an order; and
displaying, on a user interface by said one or more processors, said fourth set of textual data.

10. The computer system of claim 9, said method further comprising:
executing, by said one or more processors, an algorithm on said first set of textual data, said second set of textual data, and said third set of textual data at: a paragraph level of said textual data or a sentence level of said textual data.

11. The computer system of claim 10, wherein said algorithm is implemented with a natural language processing application programming interface (API).

12. The computer system of claim 9, said method further comprising:
identifying, by said one or more processors within said fourth set of textual data, said first set of textual data as being associated with a first time zone and said second set of textual data as being associated with a second time zone;
re-ordering, by said one or more processors, said fourth set of textual data based on said first time zone and said second time zone; and
displaying, by said one or more processors, said re-ordered fourth set of textual data on said fourth text collaboration channel.

13. The computer system of claim 9, said method further comprising:
receiving, by said one or more processors, a user action executed on said fourth set of textual data to mark a message as irrelevant;
removing, by said one or more processors, said selected message from said fourth set of textual data; and
displaying, on said user interface by said one or more processors, said fourth set of textual data without said selected message.

14. The computer system of claim 9, said method further comprising:
receiving, by said one or more processors, a user action executed on a message associated with said third set of textual data as relevant to said fourth set of textual data;
adding, by said one or more processors, said selected message to said fourth set of textual data; and
displaying, on said user interface by said one or more processors, said fourth set of textual data with said selected message.

15. A computer program product, comprising one or more computer-readable hardware storage devices having computer-readable program code stored therein, said computer-readable program code containing instructions executable by one or more processors of a computer system to implement a method to consolidate text conversations from text collaboration channels, said method comprising:
detecting, by said one or more processors, a first set of textual data on a first text collaboration channel, a second set of textual data on a second text collaboration channel, and a third set of textual data on a third text collaboration channel;
identifying, by said one or more processors, a first set of parameters from said first set of textual data, a second set of parameters from said second set of textual data, and a third set of parameters from said third set of textual data, wherein said set of parameters of said first set of textual data, said second set of textual data, and said third set of textual data are selected from the group consisting of: a name of a sender, a name of a recipient, an entity associated with said textual data, a tone of said textual data, an intent associated with said textual data, a topic of said textual data, a phrase within said textual data, keywords associated with said topic of said textual data, a timestamp associated with said textual data, a username associated with said textual data, and combinations thereof and
comparing, by said one or more processors, said first set of parameters, said second set of parameters, and said third set of parameters;
in response to said comparing,
identifying, by said one or more processors, a parameter that is a same parameter from said first set of parameters and from said second set of parameters;
determining, by said one or more processors, a frequency at which said first set of textual data and said second set of textual data comprise said identified parameter, said frequency being a sum of a total number of occurrences of said identified parameter in said first set of textual data and a total number of occurrences of said identified parameter in said second set of textual data; and
determining, by said one or more processors, that said frequency of said identified parameter exceeds a specified threshold; and
in response to said determining that said frequency of said identified parameter exceeds said specified threshold,
grouping, by said one or more processors, said first set of textual data and said second set of textual data together;
generating, by said one or more processors, a fourth set of textual data, wherein said fourth set of textual data includes said first set of textual data and said second set of textual data;
sorting, by said one or more processors, said fourth set of textual data, based on said identified parameter, in an order; and
displaying, on a user interface by said one or more processors, said fourth set of textual data.

16. The computer program product of claim 15, said method further comprising:
receiving, by said one or more processors, a user action executed on said fourth set of textual data to mark a message as irrelevant;
removing, by said one or more processors, said selected message from said fourth set of textual data; and
displaying, on said user interface by said one or more processors, said fourth set of textual data without said selected message.

17. The computer program product of claim 15, said method further comprising:
receiving, by said one or more processors, a user action executed on a message associated with said third set of textual data as relevant to said fourth set of textual data;
adding, by said one or more processors, said selected message to said fourth set of textual data; and displaying, on said user interface by said one or more processors, said fourth set of textual data with said selected message.

18. The computer program product of claim 15, wherein:
said set of parameters of said first set of textual data, said second set of textual data, and said third set of textual data are selected from the group consisting of: a name of a sender, a name of a recipient, an entity associated with said textual data, a tone of said textual data, an intent associated with said textual data, a topic of said textual data, a phrase within said textual data, keywords associated with said topic of said textual data, a time-stamp associated with said textual data, a username associated with said textual data, and combinations thereof,
said tone of said textual data is selected from the group consisting of: a positive sentiment, a neutral sentiment, and a negative sentiment, and
said intent of said textual data is selected from the group consisting of: a positive intent and a negative intent.

19. The computer program product of claim 15, said method further comprising:
identifying, by said one or more processors within said fourth set of textual data, said first set of textual data as being associated with a first time zone and said second set of textual data as being associated with a second time zone;
re-ordering, by said one or more processors, said fourth set of textual data based on said first time zone and said second time zone; and
displaying, by said one or more processors, said re-ordered fourth set of textual data on said fourth text collaboration channel.

\* \* \* \* \*